United States Patent [19]

Trahan et al.

[11] Patent Number: 5,634,962

[45] Date of Patent: Jun. 3, 1997

[54] METHOD FOR REMOVING HAZARDOUS GASES FROM ENCLOSED STRUCTURES

[75] Inventors: Timothy W. Trahan, Welsh; Robert R. Cradeur, Sulphur, both of La.; Nishanath K. Mehta, Pearland, Tex.

[73] Assignee: Serv-Tech, In., Houston, Tex.

[21] Appl. No.: 584,619

[22] Filed: Jan. 11, 1996

[51] Int. Cl.⁶ ................................................ B01D 47/14
[52] U.S. Cl. ................................ 95/158; 55/228; 55/233; 95/187; 95/204; 95/211; 95/233; 95/235; 95/240
[58] Field of Search ............................ 95/187–189, 204, 95/211, 233, 235, 237, 238, 240, 158, 260; 55/228, 229, 233; 405/258, 263; 96/204

[56] References Cited

U.S. PATENT DOCUMENTS

| | | | |
|---|---|---|---|
| 3,396,514 | 8/1968 | Hurst et al. | 95/189 X |
| 3,724,173 | 4/1973 | Fry, Sr. | 95/204 X |
| 4,043,769 | 8/1977 | Nishino et al. | 95/237 X |
| 4,102,303 | 7/1978 | Cordier et al. | 95/189 X |
| 4,331,456 | 5/1982 | Schwartz et al. | 95/237 X |
| 4,343,629 | 8/1982 | Dinsmore et al. | 95/237 X |
| 4,407,678 | 10/1983 | Furness et al. | 134/167 R |
| 4,817,653 | 4/1989 | Krajicek et al. | 134/168 R |
| 4,945,933 | 8/1990 | Krajicek et al. | 134/167 R |
| 4,976,935 | 12/1990 | Lynn | 95/235 X |
| 5,091,016 | 2/1992 | Krajicek et al. | 134/22.1 |
| 5,198,000 | 3/1993 | Grasso et al. | 95/188 X |
| 5,437,711 | 8/1995 | Kaplin et al. | 95/233 X |
| 5,460,331 | 10/1995 | Krajicek et al. | 239/263.3 |
| 5,476,986 | 12/1995 | Jacobsen | 95/237 X |
| 5,515,686 | 5/1996 | Jordan | 95/187 X |

Primary Examiner—Richard L. Chiesa
Attorney, Agent, or Firm—Jenkens & Gilchrist

[57] ABSTRACT

A method for removing hazardous gases having water solubility from storage tanks by scrubbing steps is described. Additionally, a method for removing ethylene dichloride contamination from soil is disclosed.

6 Claims, 1 Drawing Sheet

METHOD FOR REMOVING HAZARDOUS GASES FROM ENCLOSED STRUCTURES

FIELD OF THE INVENTION

Hazardous gases, volatile organic compounds such as benzene, volatile chlorinated hydrocarbons, notably ethylene dichloride, and hydrogen sulfide often contaminate the enclosed confines of storage tanks and other vessels. This invention relates to a method for rendering these enclosed spaces safe for human entry without extraneous safety equipment while preventing contamination of the environment.

BACKGROUND OF THE INVENTION

Petroleum products, particularly crude oil, are stored in storage tanks, many of which are very large, holding 500,000 barrels of crude oil in some instances. Such tanks may exceed 250 feet in diameter. Crude oil stored in these tanks deposit sludges which accumulate on the bottom of the tanks resulting in operational problems and diminished capacity. Many methods have been devised to agitate or circulate the content of the tanks, simplify the cleaning of these tanks and the removal of accumulated sludges from the tanks. Such methods and equipment have been described in U.S. Pat. Nos. 4,945,933, 4,817,653, 5,091,016, 5,460,331 and 4,407,678, for example. While each of these patents described successful means for handling the sludges in various ways, another problem has existed with respect to sour crude oil storage that is not addressed by any of the aforementioned art and, yet, creates an extremely hazardous situation for ultimate cleaning of storage tanks requiring the entry of work people into the tanks. This problem is the accumulation of dangerous hydrogen sulfide gas and for carcinogen benzene vapors in the tank.

An environmental concern has also developed in connection with soils contaminated with volatile hazardous chlorinated hydrocarbon gases, such as ethylene dichloride. Often the only containment alternative for solids contaminated with ethylene dichloride is by using an enclosed hydrocarbon storage tank as a holding vessel for such contaminated soils. As the soil lies in the tank, the volatile chlorinated hydrocarbon, especially ethylene dichloride, permeates the atmosphere within the tank creating a dangerous situation of proportions equal to that of the hydrogen sulfide invasion of the contained atmosphere of a hydrocarbon storage tank.

Additionally, the entry of a worker into an atmosphere of these gases requires care equal to that of the care required in an atmosphere invaded by hydrogen sulfide. Many attempts have been made to avoid the necessity of entry into such tanks wearing heavy, hot and cumbersome equipment which burdens the worker to the extent that efficiency is lost and dangerous, life threatening work situations may occur, particularly in an enclosed atmosphere during hot periods of time such as summer along the Texas and Louisiana Gulf Coast, where many such tanks exist.

The ethylene dichloride problem is particularly troublesome since it is a material which, when contaminating soil, must be removed but, without adequate means of containment, becomes a complicated environmental problem. Soil contaminated with ethylene dichloride also presents a threat to the water supply. Since benzene, ethylene dichloride and the chlorinated hydrocarbons are somewhat water soluble, they leach from surface soil into progressively deeper areas of soil and ultimately end up in lakes and streams. Therefore, the contamination to be contained must be separated from the possibility of leaching caused by natural circumstances such as rain and weather. However, when so protected by putting it into closed containers, such as large storage tanks, the vapor pressure of VOCs and ethylene dichloride at elevated temperatures increases to the point where the entire atmosphere within such storage vessel is, in short time, permeated with the hazardous gas mixture.

Further, the captivity of such hazardous gases within the vapor atmosphere of such storage tanks creates a hazard in the neighborhood of such tanks because of the expansion and contraction of gases with changes in ambient temperature. A temperature rise causes the gases to exit through vents into the surrounding area and, while attempts are made to contain such exposure to gases, such as hydrogen sulfide and ethylene dichloride, through absorption in carbon canisters on such vents, high concentrations of such materials quickly saturate the carbon bed and cause breakthroughs into the surrounding area creating hazards of health and fire for even a slightly careless act.

It is an object of this invention to provide the removal of hazardous gases from the interior of closed vessels, particularly storage tanks, without requiring the entry of workers into the vessel.

It is a further object of this invention to provide a solution to both the contamination problem created by the storage of sour crude hydrocarbon and the atmospheric contamination problem created by the presence of large amounts of ethylene dichloride contamination in soil.

It is still a further object of this invention to provide a method whereby the hazardous gas containing atmosphere of a closed vessel can be removed from the tank with the hazardous gases being separated from the vapors of the storage tank, itself and contained for disposal.

It is still a further object of this invention to provide a method whereby soil contaminated with volatile organic hydrocarbons having water solubility can be cleaned without causing atmospheric contamination.

SUMMARY OF THE INVENTION

The method for cleaning the atmosphere within a storage tank of hazardous gases having water solubility such as, for example, benzene ethylene dichloride and hydrogen sulfide, is accomplished by withdrawing the gases from the tank through a fan or blower where the gases are confined in a conduit. This normally creates a subatmospheric pressure on the tank and puts the gases withdrawn under a pressure greater than that of the ambient environment surrounding the storage tank. This pressurized gas is introduced into the lower area of a scrubbing zone and expands, causing the gases to cool. The gases migrate up through the scrubbing zone in counter-current flow to a stream of water which contacts the gases and absorbs the hazardous gas from the rest of the vapors within the enclosed headspace area of the vessel being cleaned. This results in a gas stream or vapor stream having a substantially reduced content, if not being substantially free, of the hazardous gases and a water stream enriched in the hazardous material, depending upon the solubility of such material at the particular temperature involved and the amount of water circulated. Many chlorinated hydrocarbons are categorized as being only slightly soluble in water, but the expansion of the gas entering the bottom or lower environs of the scrubbing zone enhances the absorption of these gases somewhat. The vapors, greatly reduced in hazardous gas content, may be returned to the enclosed vessel to sweep additional hazardous gases from the vessel into the removal system thus reducing the requirement for complete removal during the cycle.

The water stream from the scrubbing zone, containing hazardous gases, is pumped to a mixing tank where it is preferably diluted to create a recycle stream having reduced hazardous gas content for circulation back through the scrubbing zone which normally would be a packed column or some other gas-liquid contact device consistent with sound engineering practice. The rest of the diluted aqueous stream would be removed and processed through carbon containing canisters to trap the hazardous gas, such as a benzene, hydrogen sulfide or ethylene dichloride, for disposal in an environmentally benign manner.

Another aspect of this invention involves the removal and recovery for disposal of ethylene dichloride or benzene having water solubility from soil contaminated with such material. The soil would normally be contained in an enclosed vessel such as a storage tank shortly after a spill of a hazardous liquid to prevent environmental chaos. The volatile nature of the spilled material would create an atmosphere in the tank which requires special attention because of danger. In this invention, water is intermixed into the soil which is agitated to put the soils into a slurry. The water removes the ethylene dichloride (or other material having some water solubility) from the solids in the sludge or slurry created at the bottom of the vessel at least to solubility limits. The ethylene dichloride is also freed from the water to permeate the atmosphere in the headspace above the water level. It is this atmosphere that is withdrawn from the vessel and a gas stream and treated in the scrubber as mentioned above. The gas cleaning continues until there is substantially no more ethylene dichloride being released. The suspended solids in the tank, containing soil with lowered intensity of hazardous materials, are removed in a slurry with the water, thus withdrawing additional ethylene dichloride dissolved in the water. The solids drawn from the tank are separated from the water by normal solid-liquid separation devices; such as, for example, a filter press or an enclosed centrifuge to prevent atmospheric contamination. Since the presence of the ethylene dichloride remains a hazard, all parts of the process must remain isolated from the atmosphere with means for recovery of gases containing ethylene dichloride or a means for absorbing the hazardous material to prevent contamination of the atmosphere. A carbon cartridge filter has been found to work well.

DETAILED DESCRIPTION OF INVENTION

Figure 1:
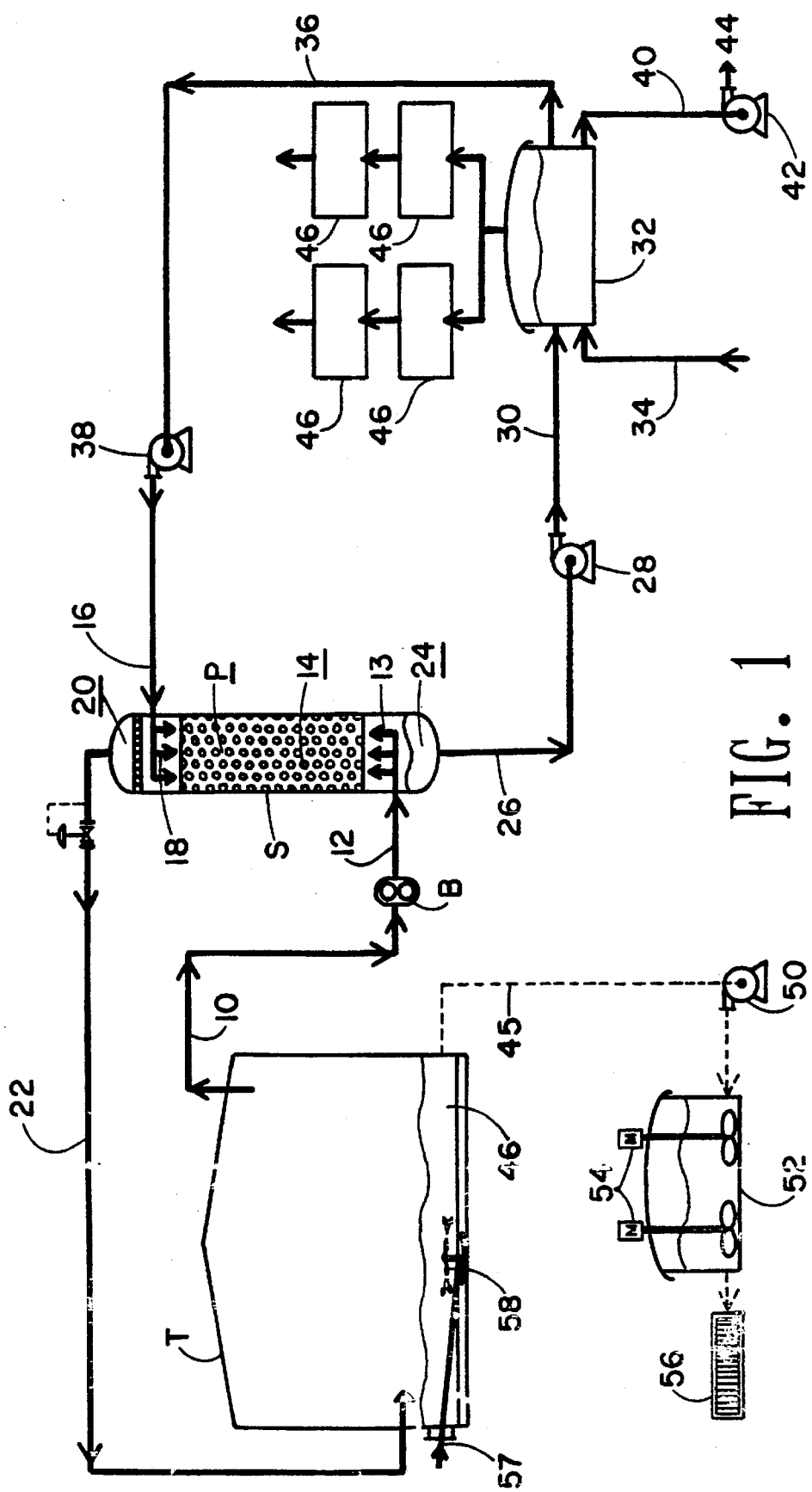
FIG. 1 is a flow sheet showing, in schematic form, the preferred embodiment of the method of this invention with gauges, valves and fittings not shown.

This invention relates primarily to the decontamination of the interior headspace of vessels containing a hazardous gas atmosphere which includes gases which have water solubility, particularly hazardous chlorinated hydrocarbons and, especially benzene, hydrogen sulfide or ethylene dichloride, which permeate the area of inside of storage tanks and, if allowed to invade the atmosphere surrounding such tanks, create a condition hazardous to people in the vicinity of the tank. A number of chlorinated hydrocarbons are volatile and, at the same time, soluble to some extent in water. These gases often find their way into the environment through a spill or leak of one kind or another. Since they have water solubility, they may be transported into an aquifer and subsequently into drinking water. They often are also volatile and, thus, become part of the air pollution problem if they remain unchecked. Consequently, a spill or contamination of soil of this nature must be physically scooped up and placed in a container, often an empty hydrocarbon storage tank. Since the chlorinated hydrocarbon and, especially ethylene dichloride, may be volatile and since tanks are subject to wide ranges of temperatures by virtue of the sun's impact upon their skins, a contaminated atmosphere is created inside of the storage vessels or tanks, which atmosphere is dangerous and difficult to abate. Of course, the tank cannot become permanent storage for this contaminated soil. In the broad sense, this invention is a method to clean the atmosphere inside storage tanks to permit entry by workers in order to clean the tank. In a specific sense, the process of this invention is a method to reduce the danger of soil contaminated with chlorinated hydrocarbons, especially ethylene dichloride to allow the proper disposal of such soil in a permitted land fill. To be effective, this method requires that the hazardous gas have water solubility. It does not have to be infinitely water soluble, but the scrubbing is carried out with water and, therefore, to be operable, requires water solubility. For example, the removal of ethylene dichloride, hydrogen sulfide and benzene have sufficient solubility to allow economic operation of the method.

The description of the method of this invention which follows is better understood by reference to the flow diagram presented herewith as examples of an embodiment of the invention described herein. The description which follows includes in it the best mode for practicing the invention known to the inventors. It will illustrate both the evacuation of the interior headspace of a vessel using a storage tank as the exemplary structure, either from the vaporization of stored sour crude oil or through the removal of ethylene dichloride from soil.

The gaseous atmosphere being treated in the process of this invention is captive in the headspace of a containment vessel shown here as storage tank T. In the embodiment where a crude oil storage tank is being decontaminated, the hazardous gas the tank atmosphere would normally be hydrogen sulfide and to a lesser extent, benzene. Where ethylene dichloride contaminated soil is involved, the hazardous gas is ethylene dichloride. The gas within the atmosphere of storage tank T is removed through line 10 to a blower B which places a suction on tank T, thus reducing the interior pressure of the tank to below atmospheric pressure. The size and make of the blower B is a matter of engineering choice. Depending upon the size and capacity of the blower, a vacuum can be drawn on the tank to the extent of several inches of water with the preferred amount being about −1 psig. A preferred range would be from about 0.5 to about 2 psig negative pressure. To affirmatively protect the surrounding vicinity of the vessel, a subatmospheric pressure must be maintained. It should be sufficiently below atmospheric pressure to accommodate temperature fluctuations. Of course, a normal storage tank could collapse with the drawing too great of a vacuum on the tank. This negative atmosphere accomplishes the purpose of maintaining a safe atmosphere in the environment surrounding tank T to prevent the hazardous gases from exiting through the vent system of the tank T (not shown) which occurs when the pressure inside the tank exceeds that of the atmospheric pressure outside tank T.

The vapors from the atmosphere of tank T passing through blower B creates a contaminated gas stream which enters line 12 at a superatmospheric pressure of from 3 to about 6 psig, preferably from 4 to 5 psig, and is conducted from there to a scrubber S where it is introduced into lower regions of the scrubbing zone 14, at the lower end of scrubbing zone 14, through a means for distributing the gas at the bottom of scrubbers, such as sparger tubes 13. The vapors containing the hazardous gas flow upwardly through the scrubber S, preferably through water-flooded packing P to contact, in counter-current flow, water entering the upper part of scrubber S through line 16 and appropriate distributors 18 to uniformly flood packing P. The distributor 18 may be any such structure well known to the skilled engineer, such as, for example, trays, wire boxes or spray nozzles. The gases entering the scrubber S are allowed to expand on entering the scrubbing zone 14, thus causing the gases to cool somewhat and increasing the solubility of such gases in the scrubbing water flowing through packing P.

Because the practice of this invention provides a way of continually keeping the environment around storage tanks clear of hazardous gases and fumes, the scrubber S may be designed as a permanent installation connected to a plurality of storage tanks creating subatmospheric pressure in several of them while collecting hazardous gases as they are released within the tanks themselves. Where the cleanup problem does not reoccur, or reoccurs with such frequency that a permanent installation is not justified, a mobile scrubbing tower of the type described in co-pending application Ser. No. 08/584,891 filed on the same date as this application, for "Mobile Decontamination Apparatus", (Attorney Docket No. 23307.20) the disclosure of which is incorporated herein by reference for all purposes.

The solubility of chlorinated hydrocarbons (and other hazardous gases) in water is available in readily available handbooks. Ethylene dichloride has a maximum solubility at 25° C. of one part by weight per 128 parts by weight of water (about 8% by weight). This is calculated by the saturation of its water, the ratio of water/gas can be calculated. At lower temperatures, the solubility is greater, resulting in more efficient removal of ethylene dichloride from the gas stream. Thus, the comparable flow rates and residence time can be easily calculated and adjusted by the skilled engineer to provide sufficient contact to remove the ethylene dichloride. In the operation of the method of this invention, of course the exiting vapors have substantially reduced content of hazardous gas, here ethylene dichloride, but will contain some ethylene dichloride, depending upon the amount of water contact and the temperature of the contact. During scrubbing operations the water level in the tower is preferably maintained at a level of from about 10% to about 60% of the scrubber height, preferably from 25% to 50%. In the practice of this invention, it is not necessary to remove all of the ethylene dichloride from the vapor where the vapor is returned to the tank. If not returned, carbon canisters may do the polishing. The flow rate of the water entering scrubber S through line 16 is from about 100 to about 300 gallons per minute and, preferably, from about 225 to about 275 gpm. Of course, this will vary with the design size of the scrubber S and the loading of the vapors entering the scrubbing zone 14. The water and entering gas stream create an internal pressure within the scrubber from about 1.8 psig to about 5 psig, preferably from about 2 to about 3 psig.

This contact with the scrubbing water removes the hazardous water soluble gases such as ethylene dichloride or hydrogen sulfide from the vapor stream resulting in vapors collecting in the headspace 20 of the scrubber S, having substantially lowered content, if not substantially free, of hazardous gases. From the headspace 20 the vapors may be vented through collection device to remove the residual hazardous gas from the vapors such as, for example, carbon canisters, but preferably the vapors are recycled back to tank T through line 22. The recycled vapors then sweep more hazardous gases from tank T into line 10 and the cycle continues until tank T is safe for entry. Where a contaminated soil is the source of atmospheric contamination the cycle continues until the soil washed in the tank releases no more ethylene dichloride. Fresh outside air could be used to sweep tank T and vent the vapors to the atmosphere after complete ethylene dichloride removal through carbon canister but the recycle gas sweep is preferred. Removal of the ethylene dichloride from water using the carbon canister is much more convenient than from a gas stream, primarily due to the size of the canister.

The water circulating through the packing P of the scrubber S in the scrubbing zone 14 becomes contaminated with the condensed and absorbed hazardous gases and collects in the bottom 24 of scrubber S. The contaminated water stream proceeds from the bottom 24 of scrubber through line 26, pump 28 and line 30 to a holding vessel 32 which is, of course, isolated from the atmosphere because of the volatility of the hazardous gases absorbed in scrubber S. In holding tank 32 a stream of feed water enters holding tank 32 through line 34 to dilute the contaminated water entering through line 30. The dilution reduces the concentration of the hazardous gas in the water stream making it useful to absorb additional hazardous gases in scrubber S when used, in the preferred manner, as a recycle stream. The water entering through line 34 into holding tank 32 may be used to adjust the temperature of the water being circulated in the system over the scrubber S, since lower temperature water will absorb more ethylene dichloride and hydrogen sulfide. Such temperature adjustment depends, of course, upon the overall operation of the process and the temperature of the source of dilution water. Most often, the temperature of the water and, indeed, the entire system will be dictated by the ambient temperature and, thus, in the summer, in the Northern Hemisphere, of course, the water circulated and the gas treated would be at a higher, nearly ambient temperature. The flow rates would, of course, then be adjusted to accommodate the temperature.

This recycle stream, diluted to approximately ¼ to ⅔ the concentration of the entering contaminated water stream through line 30 is removed from holding tank 32 as a purge stream through line 36, sent through pump 38 at the aforementioned flow-rate and conduit 16 to the scrubber S. The balance of the diluted water is removed from holding tank 32 through line 40, pump 42 and line 44 to carbon cartridge filters (not shown) where the hazardous material, whether ethylene dichloride or hydrogen sulfide is absorbed from the water onto carbon cartridges. Preferred filter cartridges are supplied by Calgon and are well known to those skilled in the art. The sizing of such cartridges, usually installed in parallel in order to allow for replacement when fully charged without shutting down the entire system, is within the ordinary skill of the engineer.

The dilution of the contaminated water stream entering holding tank 32 through line 30 protects the carbon cartridges from being consumed at a rapid rate. Holding tank 32 must be protected against the escape of vapors by the installation of carbon filter 46 on the tank vent to absorb the hazardous gases which may be released into the vapor phase. One or more carbon filters 46 are placed in series and parallel in order to prevent an accidental contamination to the atmosphere. As a safety precaution to protect against reaching an LEL condition in the vapors of tank 32, nitrogen gas was directed into the tank at a rate of from about 2 to about 6, but preferably, about 4 cubic feet per minute to dilute the ethylene dichloride level. This also extended the life of the carbon canister.

Often the gas contaminating the space of a vessel will be resulting from solids which have collected as residue inside the vessel, particularly in the case storage tanks, or in the ease of containing in such a tank contaminated soil resulting from a spill of a hazardous material. In the embodiment of our invention which involves not only the removal of hazardous gases from the vapor space in a tank, but the cleansing of contaminated solids in the tank, it is important to use some agitation or dilution of the solids in the tank in order to free noxious gases for removal and recovery as part of the tank cleaning. This occurs when there is a storage tank with a heal of heavy hydrocarbons or where the soil is contaminated with chlorinated hydrocarbons, particularly those that are water soluble and much more particularly, ethylene dichloride, specifically.

In the case where tank T is an oil storage tank, the sludge can be agitated in ways known to those skilled in the art, for instance, as described in U.S. Pat. No. 4,407,678, which is incorporated herein by reference for all purposes. The tank may be permanently fitted with dispersion apparatus as described in U.S. Pat. No. 5,460,331, also incorporated herein by reference for all purposes. The (sludge) soil 46 is mixed and slurried with water which causes the contaminant to be released from the soil into the water to saturate it and from there into the atmosphere in tank T. Where the contaminated soil has resulted from a spill, there may even be instances where the contaminant is floating on the saturated water thereby creating a maximum concentration in the tank. Additional water must be added to accomplish the removal. Part can be removed by removing the slurry itself. The slurries removed through line 45, pump 50 to a holding tank 52. There it is agitated by mixers 54 and, thence, the solids are separated by appropriate separation means shown as filter press 56. Of course, other known means for separation of solids and liquids, such as centrifuge and the like, are well known.

Other means of cleaning sludge from storage tanks are known and described in U.S. Pat. Nos. 4,817,653, 4,945,933 and 5,091,016, for example, all of which are incorporated herein by reference for all purposes.

If tank T contains a soil contaminated with ethylene dichloride to be cleaned to allow disposal, then water is introduced through line 57 to a agitation means 58, the operation of which is more specifically disclosed and described in U.S. Pat. Nos. 4,945,933 and 5,091,016 which are incorporated herein by reference for all purposes. In this instance, the use of the agitation means 58 causes the ethylene dichloride contamination on the soil to be freed from the soil into the water and then to permeate the atmosphere within the tank T with ethylene dichloride or to become dissolved in the water up to the level of solubility at the given temperature. Thus, the soil becomes substantially cleaned and then withdrawn in the form of a slurry having 2 to 3 parts by volume of water per part of solids in the slurry. It is withdrawn through line 45, pump 50 and, thence, into holding tank 52, where agitation is maintained with stirrers 54. Evaporation again occurs in a appropriate solids liquid separation device with the vapors being trapped and conveyed back into tank T directly or into the system heretofore described. The solids, are now sufficiently free of any ethylene dichloride to be removed to the environment for disposal as a solid waste in a permitted site. The liquid having minor ethylene dichloride contamination remaining is either polished by passing through a carbon canister, not shown, or transmitted to the holding tank 32 for mingling with other contaminated water streams resulting from the practice of this invention.

EXAMPLE

A fixed roof crude oil storage tank, 110 ft. in diameter served as the platform for this example of the practice of this invention. The tank had an accumulation of about 1½ ft. of soil and water contaminated with ethylene dichloride in the bottom, about 1,500 bbls of mud and sand resulting from a spill remediation was contained in the tank. The atmosphere within the tank was contaminated with well over 1,000 parts per million of ethylene dichloride. A mobile combination scrubbing/stripping column (referenced to above) was placed adjacent the tank and configured to operate as a gas scrubbing column. The column was packed with 3.5 in. diameter hollow spherical shaped packing made of injected molded plastic (JAEGER TRI-PACS, Jaeger Products, Inc., Spring, Tex.) 19.7 ft. deep. The tower was hooked to the tank as schematically shown in FIG. 1 to remove the gaseous atmosphere inside of the tank which was contaminated with more than 1,000 parts per million ethylene dichloride. Tanks 32 and 52 were covered portable tanks normally used to contain oil well fracturing materials, frac tanks, fitted with carbon pack absorption units to clean any vapors escaping from such portable tanks. Tank 52 was stirred by mixer 54. The water level in the tank containing the soil was raised from 1 ft. 8 in. to about 3 ft., with water entering line 57 through the agitator 58 which caused intimate contact between the water and the ethylene dichloride contaminated soil, forming a slurry causing the ethylene dichloride to become dissolved in the water, cleaning the soil. Water circulation was started at a rate of about 240 gpm in the loop through the scrubber using pumps 38 and 28. The liquid level in the scrubber was maintained at about one half the height of the scrubber. The vapor blower B (preferably, Model RGS-JV, size 624 driver by a 75 hp diesel. Roots Div., Dresser Ind.) was started to evacuate the ethylene dichloride laden vapors from the tank which were injected as a contaminated gas stream in the vicinity of the bottom of the scrubber S. The exhaust of the blower B raised the pressure of gases moving from the blower B to the scrubber S to a pressure of 4.5 psig, which gases emptied directly into the tower S. The operating pressure of the scrubber S was about 3.5 psig. It was a hot day on the Gulf Coast with ambient temperature of about 95° F. The compressed gas was exiling the blower at about 124° F. and the contaminated water being removed from the scrubber was at 97° F. The water exiting the scrubber contained from 2,000 ppm to about 2,700 ppm ethylene dichloride over the 12 day operation recorded. This was diluted to about 1,000 ppm ethylene dichloride by feed water entering through line 34 taken from an uncontaminated source at about 200 gpm and mixed. The injection in tank 32 was split with 240 gpm being circulated over the scrubber and 200 ppm drawn from the tank 32 through line 40 and pump 42 to be pumped through carbon canister filters to remove ethylene dichloride. The ethylene dichloride content of this stream was approximately 1,100 ppm having been diluted from the stream removed from the scrubber. The recycle stream 36 being pumped to the distributor 18 in the top of the scrubber S also contained about 1,100 ppm ethylene dichloride. While passing down the scrubber through the packing, more ethylene dichloride was absorbed and the cycle was continued. The contaminated stream 26 off the bottom of the scrubber is diluted in order to moderate the rate at which the carbon packed canisters are loaded and must be changed.

The scrubber operating pressure runs from about 2 to about 5 psig with the preferred range between about 2.1 and about 2.5. The blower, by removing the gases from the tank, draws a steady state of about −1 psig pressure on the tank.

The vapors passing through the scrubber S exit the top head space 20 of the scrubber having an ethylene dichloride content of about 925 ppm. These vapors pass through line 22 and are reintroduced into the tank T where they pick up more ethylene dichloride from the vapors in the tank contaminated by the release of ethylene dichloride. With this injection of vapors, outside air drawn through tank vents and removal of vapors, the tank is maintained under a subatmospheric pressure of about −1 psig and, therefore, escape of ethylene dichloride bearing vapors through the vent system of the tank into the operating area around the tank is eliminated. It was noted by operating personnel in vicinity of the tank that prior to the operation to clean up the soils in the tank, there had been continuing detection of ethylene dichloride odor in the area. After beginning of operation this no longer occurred. Thus, the practice of this invention on a storage tank with hazardous gases having water solubility operates to assist in cleaning the atmospheric environs in the vicinity of such a storage tank.

After sufficient agitation using apparatus described in U.S. Pat. No. 5,091,016, the soils were removed from tank T in the form of a slurry having about 60% solids to fill a covered tank 52 fitted with mixer 54. This water with suspended solids was filtered to separate the ethylene dichloride solution from the soil through a filter press 56 so that the soil could be disposed of in an environmentally safe manner. The water, still containing some ethylene dichloride was routed through carbon canister filters to remove the ethylene dichloride. The carbon filters are obtainable from Calgon Carbon Corporation of Pittsburgh, Pa. Thus, the soil has been removed from tank T for safe disposal without requiring any exposure of work personnel to the hazardous ethylene dichloride atmosphere existing in the tank. Neither have workmen been required to don cumbersome protective equipment in order to accomplish the cleaning result. Since the slurry in this particular instance was moved from tank T through line 45 to the interim tanks 52 agitated by mixers 54 faster than the separation could be accomplished through the filter press or other liquid solid separation means, the agitation through apparatus 58 would be suspended. Additional water would be introduced in the tank through line 57 during the slurrying activity until the soil was removed from the tank. In the example described above the slurrying, pumping and filtering operations continued for eleven days.

At the end of such time it was still evident that tank T was still contaminated with ethylene dichloride preventing entry of work persons to complete the cleaning of the tank. The above described evacuation, scrubbing, and circulation of vapors through the tank continued for an additional fifteen days. During this period of time of operation the water circulation was reduced to 100 gallons per minute at a pump 38 outlet pressure of 30 psig.

Having now described the invention, its preferred embodiments and best mode of practicing the invention, many of those skilled in the art would readily discern many modifications and variations of the invention herein described without departing from the invention itself as claimed.

What is claimed is:

1. Method for capturing hazardous, gases having water solubility from containment vessels comprising the steps of:

withdrawing hazardous gases, from the vessel;

introducing the gases into lower regions of a scrubbing zone;

contacting the rising gases with sufficient water in counter-current flow to capture such hazardous gases in a water stream and create a gas stream having a substantially reduced content of hazardous gas;

recycling the gas stream to the vessel to sweep additional hazardous gases from the vessel;

withdrawing the water stream and dissolved hazardous gases from the scrubbing zone;

diluting the water stream with additional water to create a recycle stream having a lowered concentration of absorbed hazardous gases and a bottoms stream;

returning the recycle stream to the scrubbing zone; and removing the absorbed hazardous gas from the bottoms stream for disposal.

2. The method of claim 1 wherein the hazardous gas is ethylene dichloride or hydrogen sulfide.

3. The method of claim 2 wherein the hazardous gas is ethylene dichloride.

4. Method for removing ethylene dichloride from contaminated soil contained in a closed vessel which comprises the steps of:

by mixing the contaminated soil with water forming a slurry;

agitating the slurry to free ethylene dichloride from the soil and form a contaminated atmosphere in the vessel;

withdrawing the vessel atmosphere contaminated with ethylene dichloride from the vessel such that the pressure within the vessel is below atmospheric pressure and the withdrawn atmosphere forms a gas stream at a greater than atmospheric pressure;

discharging the gas stream contaminated with ethylene dichloride into a scrubbing zone;

contacting the gas stream with a sufficient amount of stream water in the scrubbing zone in counter-current flow to absorb the ethylene dichloride into the water and create a vapor stream having a substantially lowered ethylene dichloride content;

returning the vapor stream having lowered ethylene dichloride content from the scrubbing zone to the vessel to sweep additional ethylene dichloride from the atmosphere of the vessel.

5. The method of claim 4, including the steps of:

removing the bottoms water stream contaminated with ethylene dichloride from the scrubbing zone;

diluting the water stream to lower the concentration of ethylene dichloride contamination and produce a recycle stream and purge stream, both contaminated with lowered amounts of ethylene dichloride;

returning the recycle stream to the scrubbing zone to absorb additional ethylene dichloride; and passing the purge stream through carbon canister filters to trap the ethylene dichloride for benign disposal.

6. The method of claim 5, wherein the contaminated soil in the vessel, suspended in water contaminated with ethylene dichloride, is removed from the vessel as a slurry;

filtering the slurry to separate soil from the ethylene dichloride contaminated water; and passing the contaminated water through carbon filters to capture the ethylene dichloride for benign disposal.

\* \* \* \* \*